United States Patent
Bland et al.

(10) Patent No.: US 8,915,538 B2
(45) Date of Patent: Dec. 23, 2014

(54) TWO SHOT DOUBLE INVERTED ACOUSTIC HOOD TO COWL SEAL

(71) Applicant: U.S. Farathane Corporation, Auburn Hills, MI (US)

(72) Inventors: Wayne Bland, Fort Gratiot, MI (US); Robert S. Zauner, Fort Gratiot, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 0 days.

(21) Appl. No.: 14/046,510

(22) Filed: Oct. 4, 2013

(65) Prior Publication Data

US 2014/0097579 A1 Apr. 10, 2014

Related U.S. Application Data

(60) Provisional application No. 61/709,673, filed on Oct. 4, 2012.

(51) Int. Cl.
| | |
|---|---|
| *B62D 25/08* | (2006.01) |
| *B62D 25/10* | (2006.01) |
| *B60J 10/00* | (2006.01) |
| *B60J 10/08* | (2006.01) |
| *B62D 29/04* | (2006.01) |

(52) U.S. Cl.
CPC .............. *B60J 10/0014* (2013.01); *B60J 10/08* (2013.01); *B62D 25/081* (2013.01); *B62D 29/04* (2013.01)
USPC ....................................................... 296/192

(58) Field of Classification Search
CPC .... B60J 10/0014; B60J 10/08; B62D 25/081; B62D 29/04
USPC ........................................................ 296/192
See application file for complete search history.

(56) References Cited

U.S. PATENT DOCUMENTS

| | | | |
|---|---|---|---|
| 4,943,102 A * | 7/1990 | Hamamoto et al. | 296/96.21 |
| 5,452,935 A | 9/1995 | Mascia | |
| 5,950,366 A | 9/1999 | Uhlmeyer | |
| 6,846,034 B1 | 1/2005 | Angus et al. | |
| 6,883,847 B2 | 4/2005 | Willett | |
| 6,898,901 B2 | 5/2005 | Petroski et al. | |

(Continued)

FOREIGN PATENT DOCUMENTS

| | | |
|---|---|---|
| FR | 2915154 A1 | 10/2008 |
| FR | 2923193 A1 | 5/2009 |

(Continued)

*Primary Examiner* — Dennis H Pedder
(74) *Attorney, Agent, or Firm* — Gifford, Krass, Sprinkle, Anderson & Citkowski, P.C.; Douglas J. McEvoy

(57) ABSTRACT

A seal adapted to extend along an interface between a vehicle hood and cowl. A profile has a base layer seating upon a flattened lip edge of the cowl, the base layer being supported upon the cowl lip edge from a rear edge to an intermediate underside stepped protrusion. The base layer further exhibits having a forward bottom projecting portion. A first upwardly/rearwardly and substantially linear angled blade extends from a first location of the base layer, with a second upwardly/forwardly and arcuately shaped blade extending from a second forward spaced location of the base layer, such that said blades project relative to underside opposing locations of the hood in contacting fashion and in order to both prevent admittance of engine exhaust into an adjoining passenger compartment and to provide optimum resistance to sound transfer.

19 Claims, 7 Drawing Sheets

(56) References Cited

U.S. PATENT DOCUMENTS

| | | |
|---|---|---|
| 7,155,863 B2 | 1/2007 | Daniel et al. |
| 7,316,447 B2 * | 1/2008 | Kelly .............................. 296/192 |
| 7,740,307 B2 | 6/2010 | Benvenuto et al. |
| 8,215,704 B2 | 7/2012 | Monnet et al. |
| 8,366,168 B1 | 2/2013 | Ksiezopolski et al. |
| 8,474,901 B2 * | 7/2013 | Serizawa et al. .............. 296/192 |
| 8,573,682 B2 * | 11/2013 | Oomen .......................... 296/192 |
| 2003/0001411 A1 | 1/2003 | Gedritis et al. |
| 2005/0184555 A1 | 8/2005 | Williams et al. |
| 2006/0226681 A1 | 10/2006 | Kelly |
| 2009/0026805 A1 | 1/2009 | Benvenuto et al. |
| 2013/0057015 A1 | 3/2013 | Allen |

FOREIGN PATENT DOCUMENTS

| | | |
|---|---|---|
| FR | 2938480 A1 | 5/2010 |
| JP | 2005527740 A | 9/2005 |
| JP | 2007056841 A | 3/2007 |
| JP | 2009040130 A | 2/2009 |
| JP | 2009041381 A | 2/2009 |
| JP | 2011069290 A | 4/2011 |

* cited by examiner

TWO SHOT DOUBLE INVERTED ACOUSTIC HOOD TO COWL SEAL

CROSS-REFERENCE TO RELATED APPLICATIONS

This Application claims the benefit of U.S. Provisional Application 61/709,673 filed on Oct. 4, 2012, the contents of which is incorporated herein in its entirety.

FIELD OF THE INVENTION

The present invention discloses a hood to cowl seal incorporating first and second combined profiles which are coextruded as a single article for providing, in combination, maximum sealing. The seal exhibits a double inverted profile for creating an air filled double wall structure for providing optimum resistance to sound transfer. The inverted seal architecture maximizes the tool and production process while avoiding seal to seal interference during compression cycles involved with dynamic performance of the seal at the cowl to hood interface.

BACKGROUND OF THE INVENTION

The prior art is documented with various types of automotive seals or other types of sealing systems, such as extending at the leading or forward edge of a plastic substrate associated with the vehicle cowl and a hood inner reinforcing structure. One objective of such seals and sealing systems is in the attempt to minimize or isolate engine fumes and noise from escaping through the hood.

Specific examples of seals in the prior art include such as a molded single blade to block engine compartment fumes or an extruded hollow bulb seal with internal air chamber to block engine noise (acoustic dampening). It has further been found that a molded single blade affords better sealing performance due to its ability to conform to irregular contact surfaces while assembled in mold with no secondary manual assembly operations. An extruded hollow bulb seal on the other hand affords optimum acoustic performance by providing an air filled double wall structure but has been found to not effectively confirm to complex contours associated with the cowl to hood interface and while also requiring assembly secondary to the molding process.

SUMMARY OF THE INVENTION

The present invention discloses a double inverted hood to cowl seal which provides both acoustical dampening and blocking engine fumes. As will be described, the seal incorporates two molded seal components, such as produced in a rotary and two-shot co-molding operation, and for providing maximum sealing and in-mold assembly with an air filled double wall structure for optimum resistance to sound transfer. As will be further described, the inverted seal architecture maximizes the tool and production process while avoiding seal to seal interference during the compression cycle.

The double inverted seal is adapted to extend along an interface between a vehicle hood and cowl and which includes a profile supported upon at least a forward lip edge of the cowl. At least one upwardly extending blade extends from the profile in contacting fashion along an underside facing location of the hood, this in order to prevent admittance of engine exhaust into an adjoining passenger compartment and to provide optimum resistance to sound transfer.

The profile has a base layer seating upon a flattened lip edge of the cowl, the base layer being supported upon the cowl lip edge from a rear edge to an intermediate underside stepped protrusion. The base layer further exhibits having a forward bottom projecting portion.

The blade may further include each of a first upwardly/rearwardly and substantially linear angled blade extending from a first location of the base layer, and a second upwardly/forwardly and arcuately shaped blade extending from a second forward spaced location of the base layer, such that said blades project relative to underside opposing locations of the hood.

An elastomer clip section is disposed between a vehicle windshield and an opposing rear extending edge or track profile of the cowl. Other features include the profile being constructed of at least one thermoplastic material exhibiting desired properties of flexibility and durability.

Yet additional features include a four sided gasket style extrusion overlaying and bonding to associated edges of the cowl. The first and second blades can also extend along at least a forward bonded edge of the cowl contiguous to the engine compartment, with a clip section extending along a spaced rear edge in contact with a track profile of the cowl in contact with a lower edge of a glass windshield.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention discloses a hood to cowl seal which combines both acoustical and environmental considerations, namely the reduction of noise along with keeping out engine fumes and the like from the passenger compartment. As will be further described with detailed reference to the several drawings, the present invention discloses a dual seal incorporating first and second combined profiles.

Figure 1:
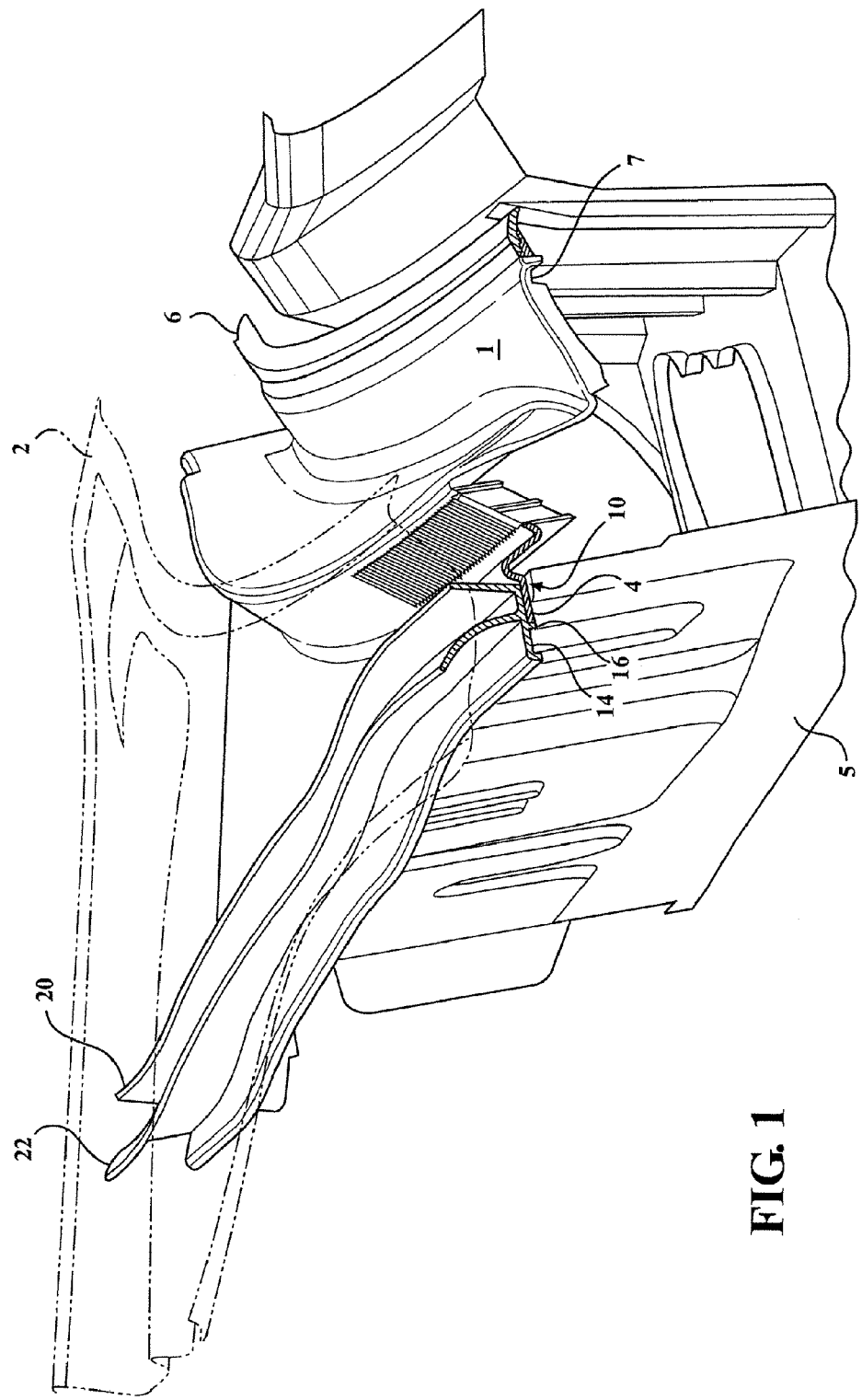
FIG. 1 is an environmental perspective of the double inverted seal located at an interface between a vehicle hood and cowl according to one embodiment of the present inventions.

As depicted in FIG. 1, the seal (see as generally depicted at 10 throughout the several views) according to a first variant exhibits a double inverted profile and which creates an air filled double wall structure for providing optimum resistance to sound transfer. The inverted seal architecture maximizes the tool and production process while avoiding seal to seal interference during compression cycles involved with dynamic performance of the seal at the cowl to hood interface.

In comparison, existing vehicle cowl designs incorporate a sealing system at the leading or forward edge between the plastic substrate and hood inner reinforcing structure, such as primarily to isolate engine fumes and noise. This typically would be a molded single blade seal to block fumes or an extruded hollow bulb seal with internal air chamber to block engine noise.

As further previously described, prior art molded single blades afford optimum sealing performance due to its ability to conform to all irregular contact surfaces while assembled in-mold with no secondary manual assembly operations. Separately, a hollow bulb seal affords optimum acoustic performance due to an air filled double wall structure, but does not conform to complex contours addressed by the initial blade seal, such shortcomings being exacerbated during the separate molding process and assembly operation required for separately producing and installing a separate bulb seal.

Figure 2:
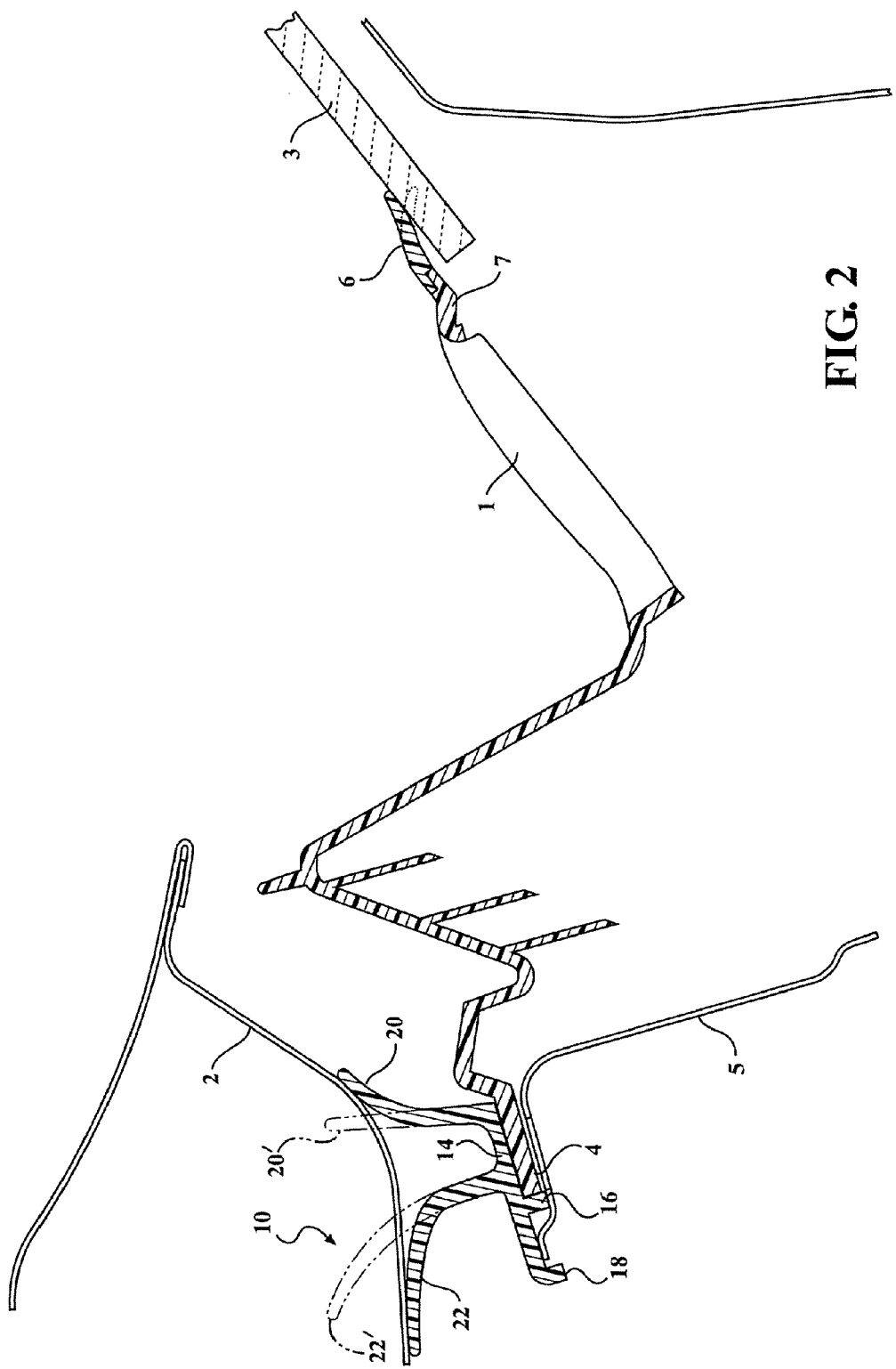
FIG. 2 is a center section cutaway in two dimension of the double inverted blade seal of FIG. 1.

The profile 10 according to the present invention is produced, in one non-limiting arrangement, by a rotary and two-shot co-molding operation, following which it is mounted to a forward edge location of a vehicle cowl 1, and which is defined by a forward part of the body of a vehicle supporting a rear location 2 of a vehicle hood and a forward/lower edge of a windshield 3 (see also FIGS. 2). Although not further shown, the cowl 1 houses such additional components as the pedals and instrument panel.

As again best shown in FIGS. 1-2, the forward edge of the cowl 1 includes a flattened lip edge 4 projecting forwardly of a frame substructure 5 of the vehicle and upon which a base layer 14 of the double inverted profile 10 seats from a rear edge to an intermediate underside stepped protrusion 16 (see as best shown by cross sectional illustration in FIG. 2). As further shown, the co-molded 10 includes a forward bottom projecting portion 18.

Figure 3:
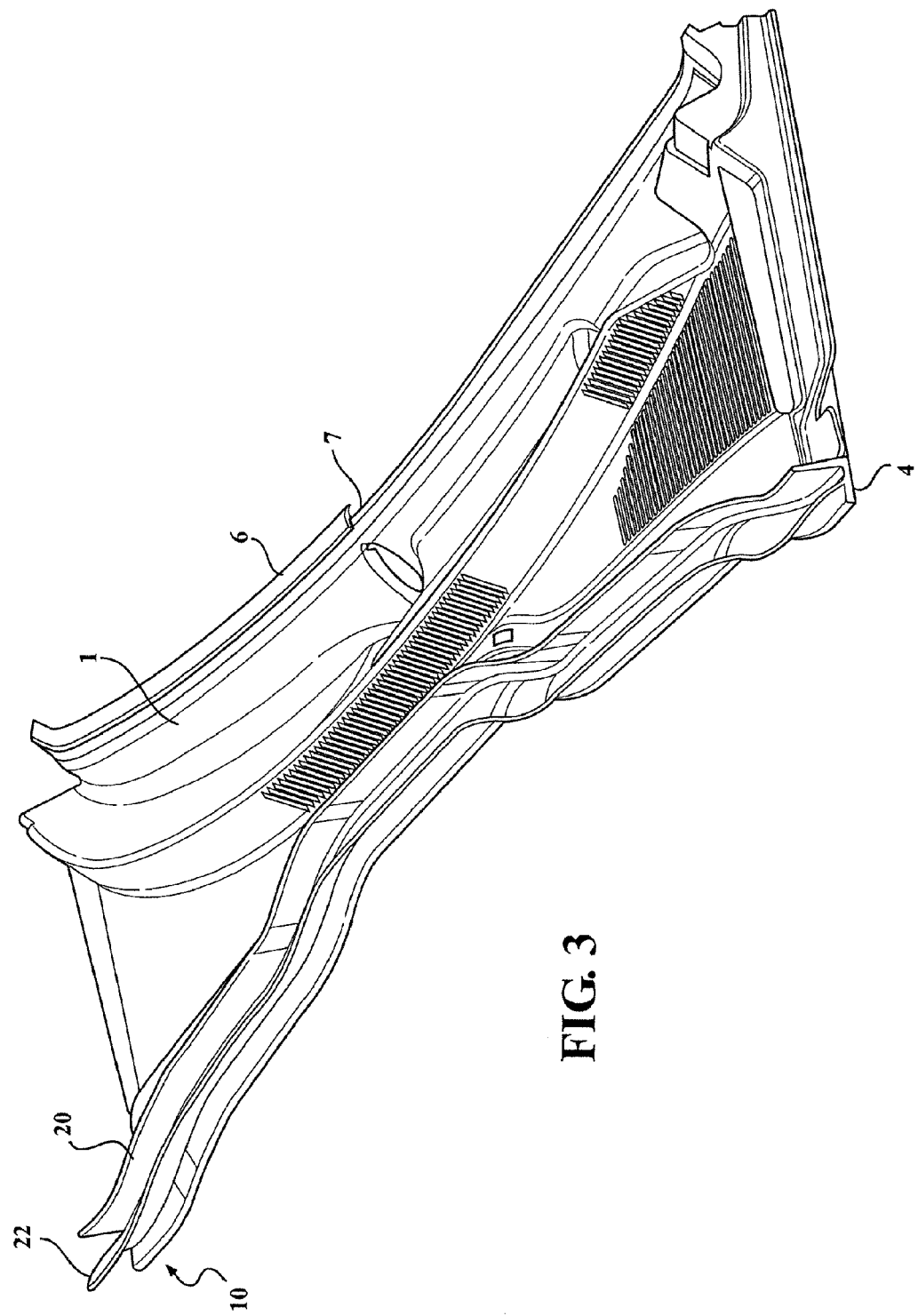
FIG. 3 is a further perspective of the double inverted seal in FIG. 1 with the hood removed.
Figure 5:
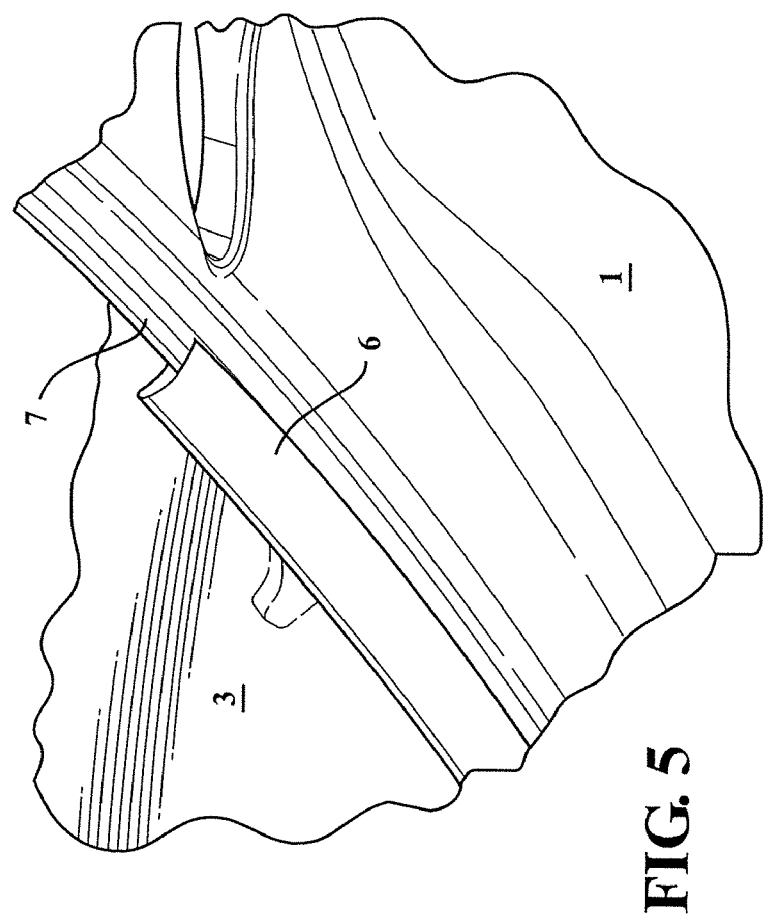
FIG. 5 is an enlarged partial and rotated perspective of an elastomer clip section disposed between a windshield and opposing rear extending upper edge of the cowl.

In the illustrated variant, the dual blade profile further includes a first upwardly/rearwardly and substantially linear angled blade 20, along with a second upwardly/forwardly and arcuately shaped blade 22. Viewing FIGS. 2-3 collectively, the blades 20 and 22 can abut against or conform to an underside of the hood 2 (see as additionally depicted in FIG. 2 both at 20' and 22' in initial extending and non-conforming positions as well as further at 20 and 22 in FIG. 2 in solid depiction in conforming fashion). Alternatively, the blades 20 and 22 can seat against or project within underside extending recesses surfaces or channels located proximate a rear of the hingedly secured hood 2 (as depicted in FIG. 2), the configuration of this overall profile 10 again assisting in preventing admittance of engine exhaust and the like into the passenger compartment.

Without limitation, the profile 10 can be produced by other forming, injection molding or extruding operations, such as in which the completed profile can incorporate any desired combination of material properties relating to flexibility and durability. In this manner, the double inverted hood to cowl seal 10 provides for maximum sealing and in-mold assembly, with an air filled double wall structure being created for optimum resistance to sound transfer. The inverted seal architecture further maximizes the tool and production process while avoiding seal to seal interference during the compression cycle.

Referring again to FIGS. 1-3 and 5 in combination, a collection of views depict an elastomer clip section 6 which is disposed between the windshield 3 and an opposing rear extending edge or track profile 7 of the cowl 1. The clip section 6 can be constructed of a further thermoplastic material and which seats within the receiving track profile 7 in the manner depicted in order to provide good sealing characteristics with the lower proximate extending edge of the windshield 3.

Figure 2A:
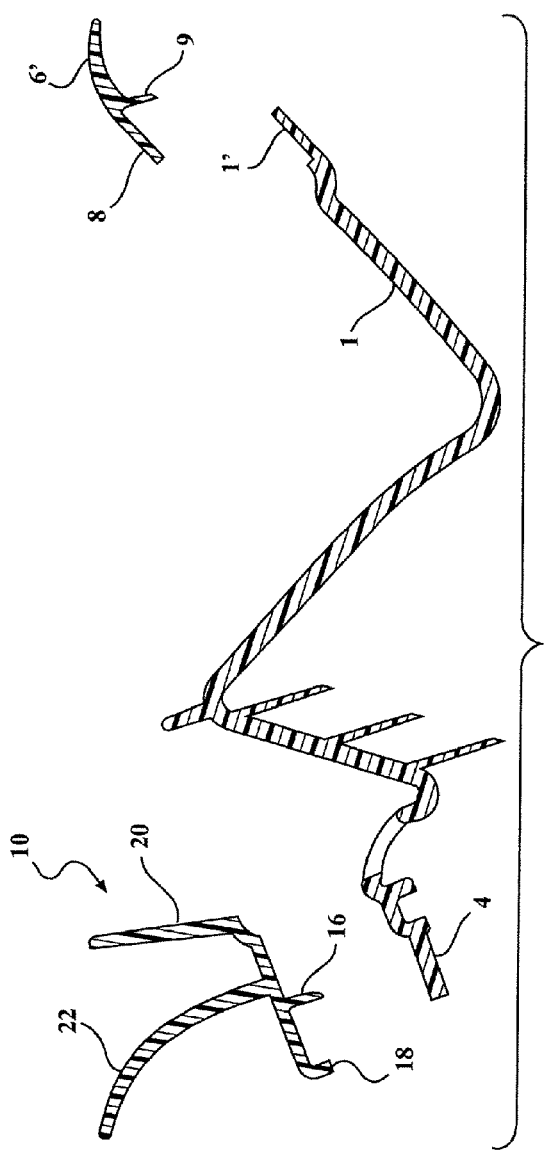
FIG. 2A is an exploded view of the center section cutaway of FIG. 2 and depicting an alternate profile associated with the molded glass clip section associated with the forward extending edge of the cowl for contacting a lower edge proximate surface of the windshield.
Figure 4:
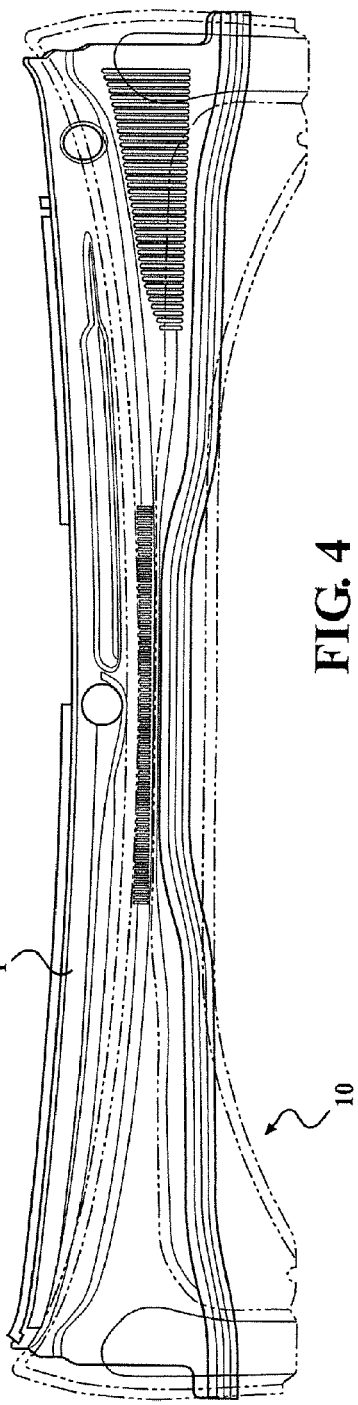
FIG. 4 is a plan view of the seal configuration in FIG. 3.

FIG. 2A is an exploded view of the center section cutaway of FIG. 2 and depicting an alternate profile 6' associated with the molded glass clip section associated with the forward extending edge of the cowl for contacting a lower edge proximate surface of the windshield. As shown, the modified clip 6' can exhibit a pair of angled tabs 8 and 9 extending from proximate base locations of the clip 6 and which are adapted to be molded to a modified and reduced thickness support edge 1' of the cowl.

Figure 6:
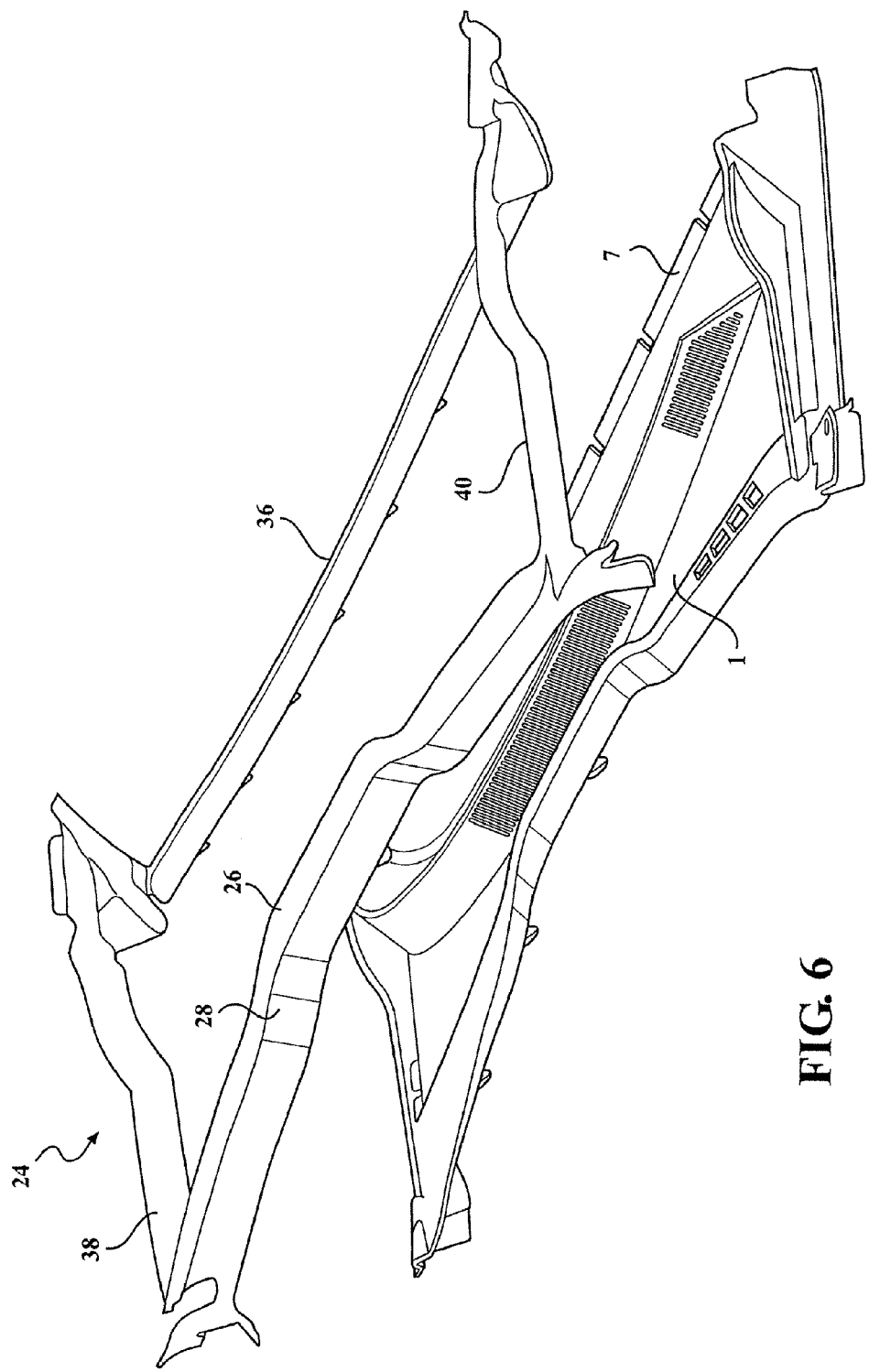
FIG. 6 is an exploded perspective of a modified double inverted seal exhibiting a four sided configuration and which is molded onto a traditional automotive intake cowl according to a further embodiment of the present invention.
Figure 7:
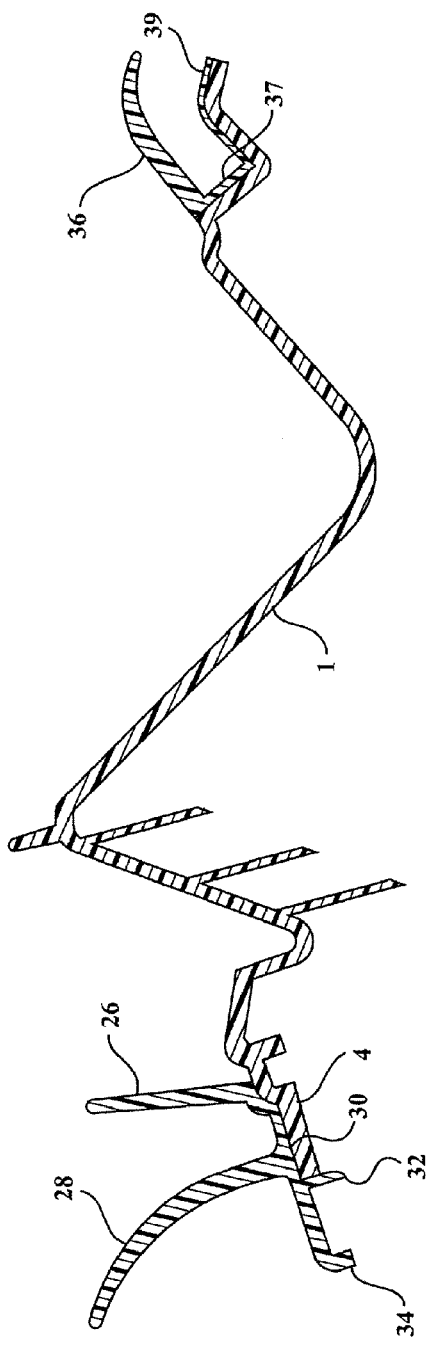
FIG. 7 is a center section cutaway in two dimension of the double inverted blade seal of FIG. 6.

Referring now to FIGS. 6 and 7, a pair of exploded perspective and center section cutaway views are shown of a modified double inverted seal, generally at 24, according to a further embodiment. In comparison to that shown in FIG. 1 at 10, the seal 24 exhibits a four sided configuration with an open interior and is molded onto a traditional automotive intake cowl 1 as a measure to prevent engine compartment fumes and noise from infiltrating into the passenger compartment.

As previously depicted, the design includes two inverted sealing walls or blades 26 and 28 which project upwardly from a base layer 30 molded atop a flattened lip edge 4 of the cowl 1. An intermediate underside stepped protrusion 32 (similar to that illustrated at 16 in FIG. 2) projects from an intermediate underside of the base layer 30 and abuts the exposed edge of the lip 4. As further shown, the extrusion 24 includes a forward bottom projecting portion 34.

Figure 8:
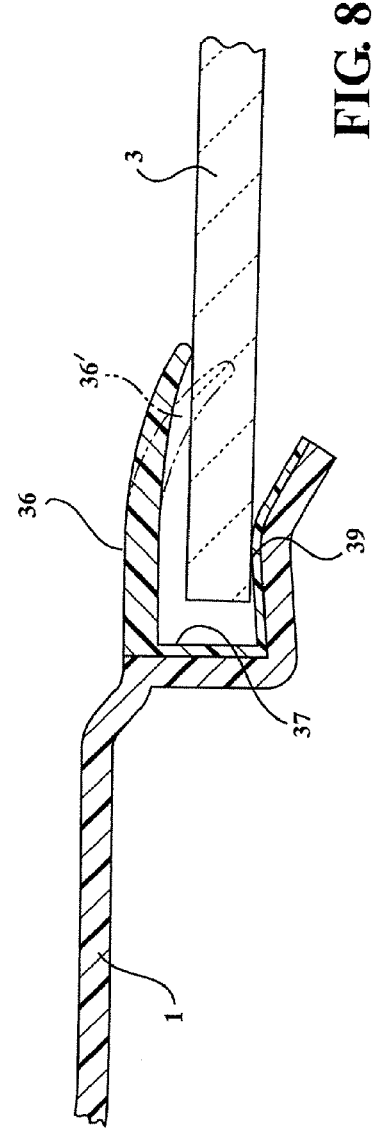
FIG. 8 is a partial plan view of the windshield engaging clip portion of FIG. 7 for seating a lower supporting edge of a windshield.

As with the first disclosed variant 10 of the double inverted seal, the four sided variant 24 is bonded permanently to the associated edges of the cowl substrate, such as through molding or any other affixation strategy including adhesives, sonic welding, etc. As further depicted by the cutaway of FIG. 7, the dual bladed configuration 20 and 22 extends along the forward bonded edge of the cowl 1 contiguous to the engine compartment, with a clip section for engaging the lower edge of the windshield (not shown) exhibiting in cross section a main configured portion 36 extending along a spaced rear edge in contact with the track profile 7 of the cowl in contact with a top extending edge of the glass windshield. The clip section portion of the seal further includes an angled configuration (see at 37 and 39 in FIG. 7) extending in cross sectional profile from an underside base location of the main configured glass overlapping portion 36 (see also in phantom at 36' in undeflected fashion in FIG. 8 prior to conforming to the lower edge surface of the windshield 3), and which in combination captures a bottom edge of the windshield glass 3 (see FIG. 8) in a sealed manner to prevent water from entering the engine compartment between the cowl 1 and windshield 3.

As depicted in FIG. 6 (but not shown in the midsection lateral cutaway of FIG. 7), first 38 and second 40 interconnecting sides complete the four sided profile gasket style configuration of the seal assembly. It is further understood that the dual bladed profile of the four sided variant 24 illustrated in FIG. 6, in addition to extending along the forward edge of the cowl 1 as shown, can also extend along part or all of the sides 38 and 40 in a possible reconfiguration of the overall seal gasket assembly.

Having described my invention, other and additional preferred embodiments will become apparent to those skilled in the art to which it pertains and without deviating from the scope of the appended claims.

The invention claimed is:

1. A seal adapted to extend along an interface between a vehicle hood and cowl, said seal comprising:
 a profile including a base layer adapted to being supported upon at least a forward lip edge of the cowl;
 a first blade extending from a first location of said base layer and a second blade extending from a second spaced location of said base layer away from said first blade and such that said blades deflect in opposite directions upon contacting underside facing locations of the hood in order to prevent admittance of engine exhaust into an adjoining passenger compartment and to provide optimum resistance to sound transfer.

2. The seal as described in claim 1, further comprising said base layer being supported upon the cowl lip edge from a rear edge to an intermediate underside stepped protrusion, said base layer further having a forward bottom projecting portion.

3. The seal as described in claim 1, further comprising said first blade extending upwardly/rearwardly and having a substantially linear angled shape in an un-deflected condition, said second blade extending upwardly/forwardly and having a substantially arcuate shape in a likewise un-deflected condition.

4. The seal as described in claim 1, further comprising an elastomer clip section adapted to being disposed between a vehicle windshield and an opposing rear extending edge or track profile of the cowl.

5. The seal as described in claim 1, further comprising said profile being constructed of at least one thermoplastic material exhibiting desired properties of flexibility and durability.

6. The seal as described in claim 3, said profile further comprising a four sided gasket style configuration overlaying and bonding to associated edges of the cowl.

7. The seal as described in claim 6, further comprising said first and second blades extending along at least a forward bonded edge of the cowl contiguous to the engine compartment, a clip section extending along a spaced rear edge in contact with a track profile of the cowl in contact with a lower edge of a glass windshield.

8. A seal adapted to extend along an interface between a vehicle hood and cowl, said seal comprising:
 a profile supported upon at least a forward lip edge of the cowl and having a base layer adapted to seating upon a flattened lip edge of the cowl, said base layer being supported upon the cowl lip edge from a rear edge to an intermediate underside stepped protrusion, said base layer further having a forward bottom projecting portion; and
 said profile further having at least one upwardly extending blade contacting an underside facing location of the hood in order to prevent admittance of engine exhaust into an adjoining passenger compartment and to provide optimum resistance to sound transfer.

9. The seal as described in claim 8, said at least one blade of said first profile further comprising a first upwardly/rearwardly and substantially linear angled blade extending from a first location of said base layer, a second upwardly/forwardly and arcuately shaped blade extending from a second forward spaced location of said base layer such that said blades project relative to underside opposing locations of the hood.

10. The seal as described in claim 8, further comprising an elastomer clip section adapted to being disposed between a vehicle windshield and an opposing rear extending edge or track profile of the cowl.

11. The seal as described in claim 8, further comprising said profile being constructed of at least one thermoplastic material exhibiting desired properties of flexibility and durability.

12. The seal as described in claim 9, said profile further comprising a four sided configuration overlaying and bonding to associated edges of the cowl.

13. The seal as described in claim 12, further comprising said first and second blades extending along at least a forward bonded edge of the cowl contiguous to the engine compartment, a clip section extending along a spaced rear edge in contact with a track profile of the cowl in contact with a lower edge of a glass windshield.

14. A seal adapted to extend along an interface between a vehicle hood and cowl, said seal comprising:
 a profile supported upon at least a forward lip edge of the cowl and including at least one upwardly extending blade contacting an underside facing location of the hood in order to prevent admittance of engine exhaust into an adjoining passenger compartment and to provide optimum resistance to sound transfer;
 said profile further including a base layer adapted to seating upon a flattened lip edge of the cowl, said base layer being supported upon the cowl lip edge from a rear edge to an intermediate underside stepped protrusion, said base layer further having a forward bottom projecting portion; and
 an elastomer clip section adapted to being disposed between a vehicle windshield and an opposing rear extending edge of the cowl.

15. The seal as described in claim 14, said at least one blade of said first profile further comprising a first upwardly/rearwardly and substantially linear angled blade extending from a first location of said base layer, a second upwardly/forwardly and arcuately shaped blade extending from a second forward spaced location of said base layer such that said blades project relative to underside opposing locations of the hood.

16. The seal as described in claim 14, further comprising said profile being constructed of at least one thermoplastic material exhibiting desired properties of flexibility and durability.

17. The seal as described in claim 15, said profile further comprising a four sided configuration overlaying and bonding to associated edges of the cowl.

18. The seal as described in claim 17, further comprising said first and second blades extending along at least a forward bonded edge of the cowl contiguous to the engine compartment.

19. The seal as described in claim 14, the rear extending edge of the cowl further exhibiting a track profile, said clip section further comprising a pair of angled tabs adapted to contact the track profile.

* * * * *